United States Patent [19]

Nir et al.

[11] Patent Number: 4,952,452

[45] Date of Patent: Aug. 28, 1990

[54] ALUMINUM PROFILE COATED WITH ORGANIC RESIN AND NON-LEAFING PIGMENTS

[75] Inventors: Zvi Nir, Kiryat Bialik, Israel; Wolfgang Rentsch, Ascheberg, Fed. Rep. of Germany

[73] Assignee: Klil Industries Ltd., Kiryat Motzking, Israel

[21] Appl. No.: 340,501

[22] Filed: Apr. 19, 1989

[30] Foreign Application Priority Data

Jul. 10, 1988 [IL] Israel ................................. 87056

[51] Int. Cl.$^5$ ............................................. B32B 15/08
[52] U.S. Cl. ................................... 428/332; 524/377; 428/463; 428/457
[58] Field of Search ....................... 428/463, 332, 457; 524/377

[56] References Cited

U.S. PATENT DOCUMENTS 3,196,120  7/1965  McLaughlin et al. ............. 524/377

FOREIGN PATENT DOCUMENTS 50-19143  7/1975  Japan.
55-49256  4/1980  Japan.

Primary Examiner—Joseph L. Schofer
Assistant Examiner—John J. Guarriello
Attorney, Agent, or Firm—Merchant, Gould, Smith, Edell, Welter & Schmidt

[57] ABSTRACT

Metallic coating compositions for aluminum profiles providing stability and weather and chemical resistance even when applied as a single coat suitable for use inter alia with the Ransburgh turbo-disc electrostatic spray system comprising:
  (a) a highly elastic cross-linking polyacrylate coating resin;
  (b) a suspending agent;
  (c) a plasticizer;
  (d) a polar solvent mixture of
    (i) a butyl alcohol;
    (ii) butyl glycol; and
    (iii) aromatic solvents;
  (e) a pigment mixture of
    (i) non-leafing metallic pigment; and
    (ii) color pigment;

a method of coating aluminum profiles and aluminum profiles coated therewith.

6 Claims, No Drawings

ALUMINUM PROFILE COATED WITH ORGANIC RESIN AND NON-LEAFING PIGMENTS

FIELD OF THE INVENTION

The present invention concerns a method of coating aluminium profiles with metallic finishes. The invention also provides metallizing coating compositions for use on aluminium profiles with such method.

BACKGROUND OF THE INVENTION

Aluminium profiles are used extensively in applications such as window and door frames, display counters and partitions. Such aluminium profiles come in several finishes, among which are metallic finishes such as the well-known silver-metallic and gold or bronze metallic finishes. Recently a brown-metallic finish has become popular as well. These finishes involve anodizing the aluminium. Alternatively, aluminum profiles have been coated with paints which are baked onto the aluminum. To anodize aluminum, it has to undergo an electrochemical process which is rather complex, expensive and limits the colours obtainable. Aluminum profiles that are painted require first to undergo a preliminary process of undercoating in order to provide a suitable surface for the paint to adhere to, since paints do not adhere well to aluminum.

Although many advances and developments have taken place in the coating industry, including the art of finishing aluminum profiles, there are a number of problems that have as yet not been overcome. First of all the finished aluminum profiles, which are used for so many diverse applications, require special resistance against degradation by light, chemicals, corrosive atmospheric gases and other pollutants, because they are used so much under outdoor conditions in displays and window frames where ultra-violet light, industrial gases and other weather conditions deteriorate the coating and the aluminum. This is particularly true for use of aluminum near coastal areas, where oxygen and salt water in the air subjects the profiles to severe corrosion.

A further problem is caused by the fact that modern household and sanitary cleaning materials contain bleaches and alkali which react with aluminum and deteriorate its surface. These problems dictate that the aluminum profiles for use in such applications must have complete protection from contact between any corrosive atmosphere and the aluminum. This protection is very difficult to achieve in profiles with intricate channels and grooves, as is the case with aluminum profiles. Yet the demand for aluminum profiles for such applications is ever-increasing, particularly for profiles with metallic finishes at a reasonable price.

SUMMARY OF THE INVENTION

It is the object of the present invention to provide an economic method for coating aluminum profiles with a metallic finish.

Another object of the present invention is to provide a continuous process for making metallic coating aluminum profiles.

It is a further object of the present invention to provide a highly stable, uniformly coated aluminum profile having a metallic finish.

A still further object of this invention is to provide uniformly coated, metallic finish aluminum profiles of up to six meters in length.

Yet another object is to provide a metallic finish coating composition for application to aluminum profiles.

The above objectives are obtained by the method which will be described in details as follows.

DETAILED DESCRIPTION OF THE INVENTION

The method of this invention involves the use of the Ransburgh turbo-disc electrostatic spray system for coating aluminum profiles with a specially formulated coating composition. The Ransburgh turbo-disc electrostatic sprayer is a known apparatus for painting aluminum profiles with regular paints. In this system the profiles are hung vertically on a track moving in a closed circuit. The paint operation is carried out electrostatically. The vertically hung aluminum profiles are moved continuously along a track from station to station until they get to the paint chamber.

In this chamber there is a hydraulic piston which moves vertically up and down, whose movement with respect to speed and distance is controlled. At the lower end of this hydraulic piston there is a controlled high speed revolving disc plate. Paint is transferred via suitable tubing onto this spinning disc in measured quantities and is thus sprayed onto the aluminum profile. An electrostatic charge is imparted onto the paint at the disc while it is being sprayed, while the aluminum profile is charged with an opposite electrostatic charge as it moves along the track circling the disc. The electrostatic charges can be controlled as far as intensity and time. The opposite electrostatic charges on the paint and on the aluminum profile assure that the paint is attracted to all parts of the profile and the thickness of the coating is controlled by the mechanical and electrical parameters of the system. As the spinning disc slowly moves up and down with the hydraulic piston in a uniform manner adjacent the vertical profile, the coating on the entire length of the profile is controlled to be applied uniformly. This electrostatic attraction between paint and aluminum profile also is responsible for the coating to take place not only on the surface of the profile facing the disc, but also on the sides and rear of the profile, since the paint as it is sprayed in the direction of the profile is attracted to all parts thereof. This enables complex profiles, having numerous grooves and protrusions, to be uniformly coated with the spray paint.

The Ransburgh spray system is not in itself new and has been used for coating with ordinary paints. Such paints which are pigmented opaque do not present any particular difficulty in formulation for this application.

Metallic finishes on base surfaces, such as plastic and metals, are known and their use in corrosion resistant applications is widespread on steel surfaces of automobiles. Such anti-corrosion metallic finishes on steel surfaces require numerous coats, one on top of another, in order to produce the desired metallic effect. Furthermore, these finishes are designed for use on large, smooth surfaces and not on intricate profiles with channels and grooves. Aluminum surfaces, on the other hand, are not very amenable to being metallized with such coatings, since the coatings used on steel surfaces do not adhere well to aluminum surfaces and are not suitable for use with intricate profiles.

We have discovered coating compositions suitable for metallizing aluminum profiles and which are particularly suitable for use with the Ransburgh spray system.

The novel compositions provide metallic-finished aluminum profiles with only a single coat of paint.

The novel coating compositions of this invention comprise—
- (a) a coating consisting of highly elastic crosslinking polyacrylate resin;
- (b) a suspending agent;
- (c) a plasticizer;
- (d) polar solvent mixture of butyl alcohol, butyl glycol, and a mixture of aromatic solvents; and
- (e) a mixture of pigments consisting of a non-leafing metallic pigment and a coloured pigment.

Suitable resins for the novel metallic coating compositions are, for example, Larodur 145 (TM) acrylic resin.

Suspending agents can be, among others, treated montmorillonite such as Bentone 34 (TM) or pyrogenic silicic acid such as Aerosil R 972.

The non-leafing metallic pigment, for example, may be Stapa (TM) and the colour pigment may be, for example, brass-copper power Resist LT stabil (TM), Lamp black Printex G (TM), Hostapermgelb H4G (TM) and Hosta-permorange GR (TM), just to cite a few.

Suitable proportions of the coating composition are as follows:

| | |
|---|---|
| Acrylate resin (solid) | 28-35 parts |
| Suspending agent | 0.5-1 parts |
| Plasticizer | 2-5 parts |
| Solvent: Butyl alcohol | 16-20 parts |
| Butyl glycol | 3-5 parts |
| Aromatic solvents | 28-32 parts |
| Total solvents | 47-57 parts |
| Metal pigments: | |
| non leafing alupigment | 0.5-5 parts |
| colour pigments (carbon black, andere) | 1-6 parts |
| metallic colour pigments | 4-6 parts |
| total pigments | 6-15 parts |

A preferred combination contains in the colours, silver metallic

| | |
|---|---|
| resin | 35 parts |
| suspending agent | 1 part |
| plasticizer | 3 parts |
| solvent mixed | 47 parts |
| Alu non leafing metallic pigment | 6 parts |
| colour pigments | 6 parts |
| in the colour eloxal brown Ton 13 Klil | |
| resin | 35 parts |
| suspending agent | 1 part |
| plasticizer | 3 parts |
| solvent mixed | 47 parts |
| brass copper power metallic pigments | 10 parts |
| colour pigments | 4 parts |

This novel coating composition provides the following advantages when applied to aluminum profiles with the Ransburgh spray system. The coating composition is non-dripping, i.e. when used in this system the paint does not flow in the object surface but stays put at the spot that it contact initially. This leads to smooth uniform thickness. The particular combination of resins provides just the right balance of strong corrosion-resistant coating which adheres permanently to the aluminum. The specific solvent system in this composition is particularly critical, in that it provides just the right degree of evaporation and drying to prevent running of the paint on the profile surface and avoids pinholes, often caused by too quick drying. This coating composition gives high weather and chemical resistance and is extremely stable. The thickness of this coat on the aluminum can range from 20-60 millimicrons and preferably 30-40 millimicrons when dry. Aluminum profiles subjected to such a single coat of metallic paint as defined above are much less expensive than the anodized aluminum profiles and yet provide a very similar surface appearance, particularly the brown or dark bronze look.

We claim:

1. Aluminum profiles having a coating providing a metallic appearance, said coating being of uniform thickness of about 20-60 millimicrons, said profiles being weather and chemical resistant, said profiles being manufactured by spraying aluminum profiles with an organic coating comprising:
   - (a) a highly elastic cross-linking polyacrylate coating resin;
   - (b) a suspending agent;
   - (c) a plasticizer;
   - (d) polar solvent mixture of
     - (i) butyl alcohol; and
     - (ii) butyl glycol; and
     - (iii) aromatic solvents; and
   - (e) a mixture of pigments consisting of
     - (i) non-leafing metallic pigment; and
     - (ii) coloured pigment.

2. A coating aluminum profile according to claim 1 as follows:

| | |
|---|---|
| Acrylate and polyester coating resins | 28-35 parts |
| Suspending agent | 0.5-1 part |
| Plasticizer | 2-5 parts |
| Solvent: | |
| Butyl alcohol | 16-20 parts |
| Butyl glycol | 3-5 parts |
| Aromatic solvents | 28-32 parts |
| Total solvent | 17-57 parts |
| Metal pigment: | |
| Non-leafing metallic pigment | 8-12 parts |
| Colour pigment: | |
| Carbon black | 4-6 parts |
| Metallic colour pigment | 8-12 parts |
| Total metal pigment | 22-28 parts |

3. A aluminum profile as claim 1 wherein the resin is Larodur 145 (TM).

4. A aluminum profile as claim 1 wherein the suspending agent is selected from bentonite and aerosil.

5. A aluminum profile as claim 1 wherein the non-leafing metallic pigment is STAPA (TM).

6. A aluminum profile as claim 1 wherein the colour pigment is a mixture of carbon black and Hostapermgelb H4G (TM) and Hostapermorange GR (TM).

* * * * *

UNITED STATES PATENT AND TRADEMARK OFFICE
CERTIFICATE OF CORRECTION

PATENT NO. : 4,952,452

DATED : August 28, 1990

INVENTOR(S) : Zvi Nir et al.

It is certified that error appears in the above-identified patent and that said Letters Patent is hereby corrected as shown below:

Column 4, line 29, delete "and";

Column 4, line 32, for "a mixture of pigments consisting of" should read --a pigment mixture of--; and Column 4, line 45, for "17" insert --47--.

Signed and Sealed this

Twelfth Day of May, 1992

Attest:

DOUGLAS B. COMER

*Attesting Officer*  *Acting Commissioner of Patents and Trademarks*